US010332369B2

United States Patent
Lo et al.

(10) Patent No.: US 10,332,369 B2
(45) Date of Patent: Jun. 25, 2019

(54) SYSTEM FOR SETTING NON-WARNING AREA OF PEOPLE DETECTOR AND METHOD THEREOF

(71) Applicant: Delta Electronics, Inc., Taoyuan (TW)

(72) Inventors: Tien-Szu Lo, Taoyuan (TW); Meng-Seng Chen, Taoyuan (TW); Hsin-Yu Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/840,022

(22) Filed: Dec. 13, 2017

(65) Prior Publication Data
US 2018/0308329 A1 Oct. 25, 2018

(30) Foreign Application Priority Data
Apr. 19, 2017 (CN) .......................... 2017 1 0256640

(51) Int. Cl.
G08B 13/19 (2006.01)
G08B 25/00 (2006.01)
G06K 9/00 (2006.01)
G06F 3/048 (2013.01)

(52) U.S. Cl.
CPC ............ *G08B 13/19* (2013.01); *G06F 3/048* (2013.01); *G06K 9/00771* (2013.01); *G08B 25/008* (2013.01)

(58) Field of Classification Search
CPC . G05B 2219/2642; G05B 15/02; F24F 11/62; F24F 11/46; F24F 11/65; F24F 2120/10; F24F 2120/20
See application file for complete search history.

(56) References Cited

U.S. PATENT DOCUMENTS

| 9,811,065 B2 | 11/2017 | Chen et al. | |
| 2009/0174658 A1* | 7/2009 | Blatchley | G06F 1/1601 345/158 |
| 2014/0122806 A1 | 5/2014 | Lin et al. | |

(Continued)

FOREIGN PATENT DOCUMENTS

| TW | I463833 B | 12/2014 |
| TW | I554747 B | 10/2016 |
| WO | WO 2014136522 A1 | 9/2014 |

*Primary Examiner* — Hongmin Fan
(74) *Attorney, Agent, or Firm* — Muncy, Geissler, Olds & Lowe, P.C.

(57) ABSTRACT

A system for setting non-warning area of people detector including an analysis module, a human-machine interface (HMI) and several people detectors (PDs) are disclosed. The PDs are arranged in a physical space and respectively corresponding to multiple areas to be monitored. The HMI displays thermal image records detected by the PDs, and receives external operation to trigger the analysis module. The triggered analysis module performs a setting action for setting a non-warning area of the multiple areas. The analysis module transmits information related to the set non-warning area to a corresponding one of the PDs for adjusting parameters of the corresponding PD after finishing the setting action. Accordingly, the adjusted PD excludes the non-warning area from its detecting range, whereby improving its detecting efficiency and accuracy.

18 Claims, 7 Drawing Sheets

(56) References Cited

U.S. PATENT DOCUMENTS

2014/0368646 A1* 12/2014 Traff .................. H04N 5/33
                                                            348/143
2016/0018560 A1    1/2016 Shimizu et al.
2017/0089763 A1*  3/2017 Freer .................. G01J 5/0096

* cited by examiner

SYSTEM FOR SETTING NON-WARNING AREA OF PEOPLE DETECTOR AND METHOD THEREOF

BACKGROUND OF THE INVENTION

1. Field of the Invention

The invention relates to a people detector, and in particular to a setting system and a setting method for setting an non-warning area of people detectors.

2. Description of Prior Art

In order to detect the environment status inside a space and to control multiple equipments of the space efficaciously and automatically, current systems may arrange people detectors (PDs) inside the space for detecting whether there is a person in the space or not. Further, the systems may control the equipments of the space automatically according to the detecting results of the PDs (for example, when the PDs detect a person left the space, the system turns off air-conditions and lights of the space).

Generally, the PDs detect thermal images of the space, and determine whether there is a person in the space or not according to the thermal images. However, there are some non-human heating objects often present in a space, such as projectors, drinking fountains, printers, photostats, coffee machines, water heaters, etc., and these heating objects will affect the detecting accuracy of the PDs.

Further, the heating objects may affect the efficiency of the eqipments that collaborate with the PDs. For example, a projector may generate high temperature while it's working, and it may retain a certain temperature for a while (e.g., 20 minutes) after being turned off. Thus, after a person turns off the projector and leaves a space, the PDs may still detect the retained temperature and misjudge the projector as a person. Therefore, a system with the PDs may not be able to turn off an air-condition of the space immediately right when the personleaves. As a result, the air-condition may operate for another 20 minutes after the person leaves the space, and it may cause an unnecessary waste of power.

SUMMARY OF THE INVENTION

The objective of the present invention is to provide a setting system and a setting method for setting an non-warning area of people detectors, which may set an area where a heating object exists that will affect the detecting effect of PDs as an non-warning area, and excludes the non-warning area from a detecting range of the PDs.

According to one aspect of the present invention, the setting system at least includes an analysis module, a human-machine interface (HMI) and several people detectors (PDs). The PDs are arranged in a physical space and respectively corresponding to multiple areas to be monitored. The HMI displays thermal image records detected by the PDs, and receives external operations to trigger the analysis module. The triggered analysis module performs a setting action for setting a non-warning area of the multiple areas. The analysis module transmits information related to the set non-warning area to a corresponding one of the PDs for adjusting parameters of the corresponding PD after finishing the setting action.

The disclosure of the present invention may preset an area where a non-human heating object exists as a non-warning area and leads the PDs to exclude the non-warning area from their detecting range. In comparison with related prior art, the PDs in the present invention have higher detecting efficiency and detecting accuracy.

DETAILED DESCRIPTION OF THE INVENTION

The present invention discloses a system for setting an non-warning area of people detectors and a method for setting an non-warning area of people detectors (referred to as a setting system and a setting method hereinafter), the setting system and the setting method can preset an area where a non-human heating object exists as a non-warning area, and exclude the non-warning area from a detecting range of people detectors (PDs). Therefore, the detecting efficiency and the detecting accuracy of the PD are improved.

Figure 1:
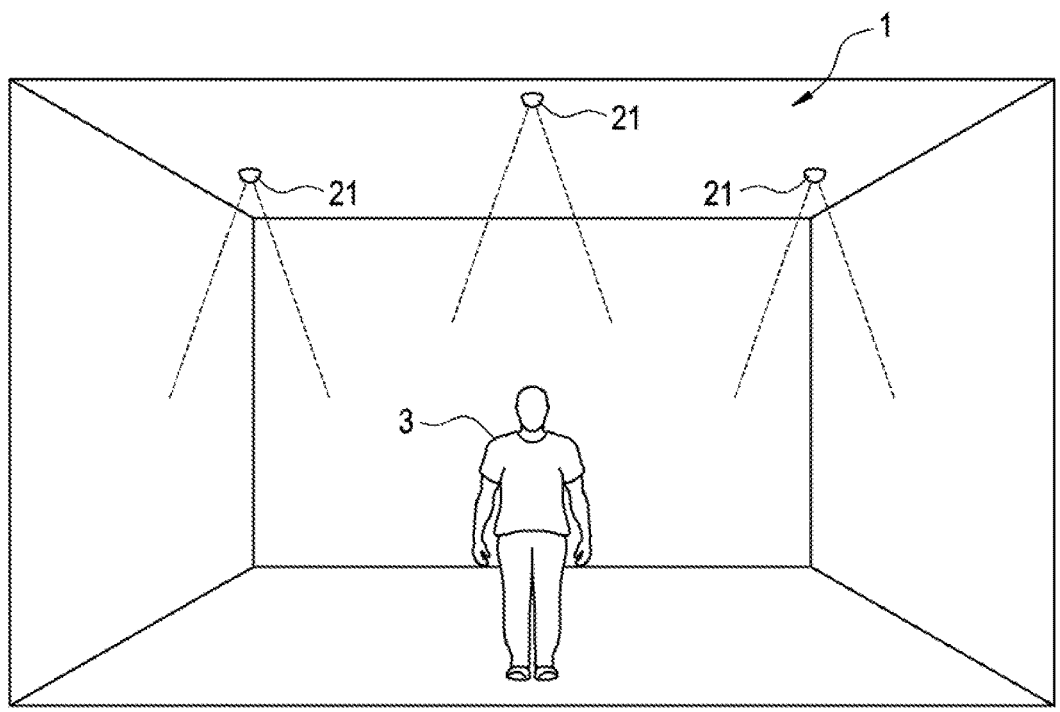
FIG. 1 is a diagram showing a space of a first embodiment according to the present invention.

FIG. 1 is a diagram showing a space of a first embodiment according to the present invention. Several PDs 21 are arranged inside a physical space 1, and the angles of the PDs 21 are respectively adjusted, and then the detecting ranges of the PDs 21 may cover multiple areas which are needed to be monitored. Therefore, the PDs 21 may detect and generate thermal image records of the multiple areas. If there is a person 3 in the space 1, at least one of the PDs 21 may identify the existence of the person 3 according to the thermal image records.

Figure 2:
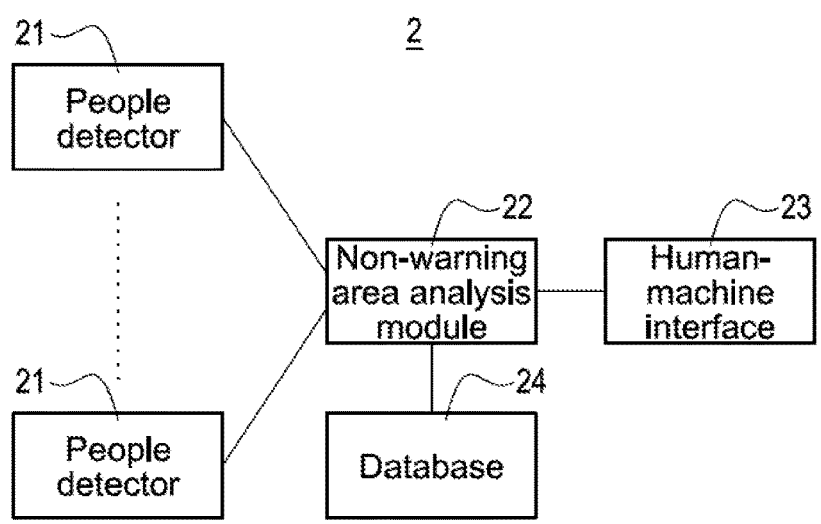
FIG. 2 is a block diagram of a setting system of a first embodiment according to the present invention.

FIG. 2 is a block diagram of a setting system of a first embodiment according to the present invention. As shown in FIG. 2, the setting system 2 includes several people detectors (PDs) 21, a non-warning area analysis module 22 (referred to as the analysis module 22) and a human-machine interface (HMI) 23. The PDs 21 are physically arranged inside the space 1 for respectively detecting the thermal image records of the multiple areas. The HMI 23 may be a monitor or a display used to receive and display the thermal image records detected by the PDs 21.

In one embodiment, the HMI 23 includes input units (such as a keyboard, a mouse, a touch pad, etc.) and output units (such as a display, a speaker, etc.), or includes a touch screen that is integrated with an input unit and an output unit. The HMI 23 may display the thermal image records, and also receive user's external operations (detailed discussed below).

The analysis module 22 is electrically connected with the PDs 21 and the HMI 23. The analysis module 22 transmits the thermal image records detected by the PDs 21 to the HMI 23 to display on the HMI 23, and the analysis module 22 is triggered to execute corresponding actions while the HMI 23 receives the aforementioned external operations.

In particular, if the HMI 23 receives the external operations, the analysis module 22 may be triggered by the HMI 23, and the triggered analysis module 22 may execute a setting action for setting a non-warning area of the multiple areas according to the thermal image records. After finishing the setting action, the analysis module 22 transmits the information related to the set non-warning area (for example, the information may include an area number or a coordinate of the non-warning area) to a corresponding one of the PDs 21, so as to adjust a detecting parameters of the corresponding PD 21. In the present invention, the adjusted PD 21 will exclude the non-waring area from its detecting range while performing detection.

For example, a space 1 includes a first area, a second area, a third area, and a fourth area. The setting system 2 includes a first PD, a second PD, and a third PD, wherein the first PD is used to detect the first area (i.e., the detecting range of the first PD covers the first area), the second PD is used to detect the second area (i.e., the detecting range of the second PD covers the second area), and the third PD is used to detect the third area and the fourth area (i.e., the detecting range of the third PD covers both the third area and the fourth area). If the analysis module 22 sets the third area as a non-warning area through the external operation, it may transmit information related to the non-warning area to the corresponding PD (in this example, transmitting the information related to the third area to the third PD). Therefore, the third PD may be adjusted to exclude the third area from its detecting range.

In one aspect of the present invention, the setting system 2 sets one or more non-warning areas according to the appearance of non-human hot spot(s) of each area. An area without any hot spot or an area with a hot spot that regarded as a person will not be set as the non-warning area.

In one embodiment, the analysis module 22 may be a unit, a module, or a server implemented by hardware. In another embodiment, the analysis module 22 may be an application program implemented by software. The analysis module 22 may exist independently or integrates with any of the PDs 21 or the HMI 23, but not limited thereto. Besides, the analysis module 22 may be arranged in same space 1 or building with the PDs 21 and the HMI 23, or may be arranged in Cloud and connected with the PDs 21 and the HMI 23 through the Internet.

In one embodiment, the setting system 2 further includes a database 24. The database 24 is electrically connected with the analysis module 22 and stores the information related to the non-warning area. In an embodiment, the database 24 may exist independently, or integrates with any of the analysis module 22, the PDs 21, or the HMI 23, but not limited thereto. Similarly, the database 24 may be arranged in same space 1 or building with the analysis module 22, or be arranged in Cloud and connected with the analysis module 22 through the Internet.

Figure 3A:
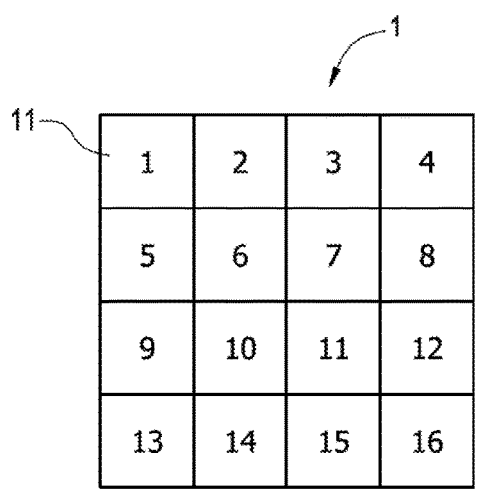
FIG. 3A is a diagram of displaying areas of a first embodiment according to the present invention.
Figure 3B:
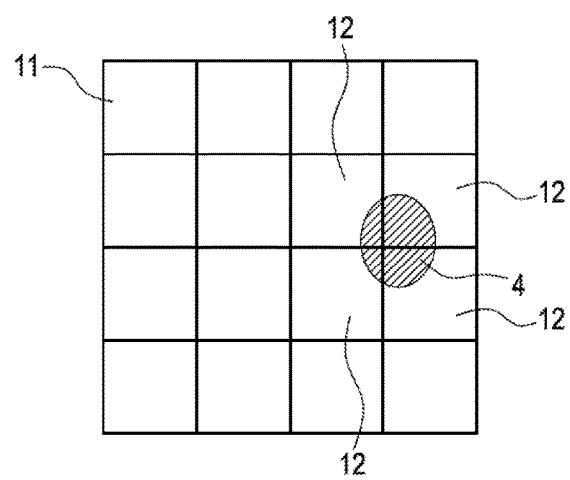
FIG. 3B is a diagram of displaying a hot spot of a first embodiment according to the present invention.

FIG. 3A is a diagram of displaying areas of a first embodiment according to the present invention. FIG. 3B is a diagram of displaying a hot spot of a first embodiment according to the present invention. As shown in FIG. 3A, the HMI 23 may display an image of the space 1 according to an array (i.e., represent the areas by an array on the HMI 23), and thus the HMI 23 divides the space 1 into several areas 11 with same size and giving numbers for each of the areas 11 to form an array. Such array may cover all the areas 11 that need to be monitored. In the embodiment of FIG. 3A, the HMI 23 displays sixteen areas 11 according to a 4×4 array (i.e., divides the space 1 into sixteen areas 11 having the same size), but not limited thereto.

In one embodiment, the size of the above array is proportional to the resolution of each of the PDs 21. In other words, the larger the resolution of the PDs 21 is, the larger the array will be (for example, it may be a 8×8 array, a 16×16 array, etc.), and the definition of the areas will be more precise.

As shown in FIG. 3B, the HMI 23 may display the thermal image records detected by the PDs 21 according to the above array, and thus a user may see the area(s) 11 where a hot spot 4 exists through the HMI 23. If the setting system 2 identifies the hot spot 4 as a non-human hot spot after analyzing, determining or gathering statistics, it will set the area(s) where the non-human hot spot exists as the non-warning area 12 by the user (manually) or the analysis module 22 (automatically). In the embodiment of FIG. 3B, a seventh area, an eighth area, an eleventh area, and a twelfth area where the hot spot 4 exists are set as the non-warning area 12. When performing detecting, the PDs 21 will exclude the seventh area, the eighth area, the eleventh area, and the twelfth area from their detecting range.

Figure 4:
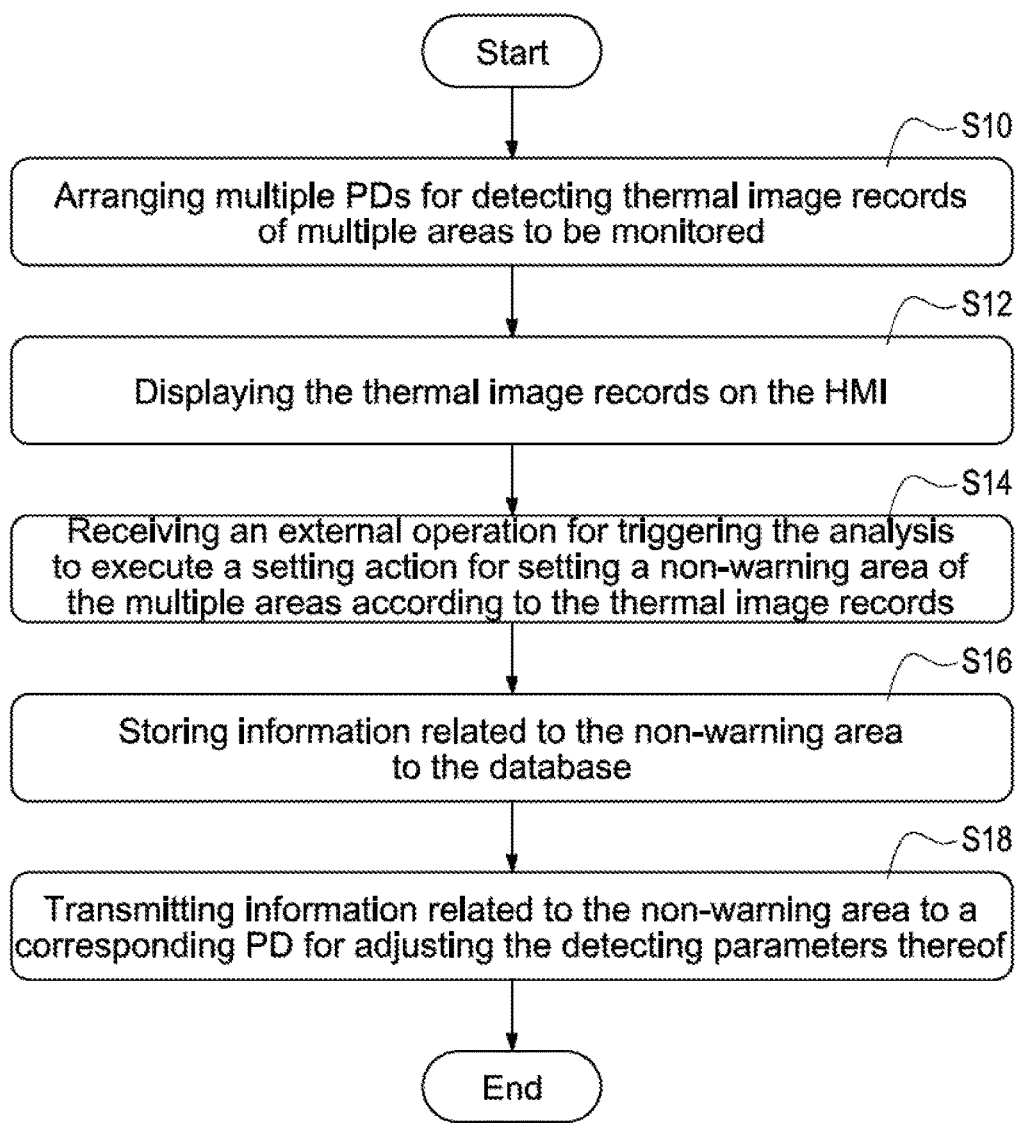
FIG. 4 is a flowchart of setting an non-warning area of a first embodiment according to the present invention.

Referring to FIG. 2 and FIG. 4, FIG. 4 is a flowchart for setting non-warning area of a first embodiment according to the present invention. FIG. 4 discloses the steps corresponding to the setting method of the present invention, and the setting method is mainly adopted by the setting system 2 of FIG. 2.

As shown in the FIG. 2 and FIG. 4, the setting method of the present invention first assembles and arranges the multiple PDs 21 in physical environments and adjusts the angle of the PDs 21, so the detecting ranges of the PDs 21 are respectively covering one or more areas to be monitored for the PDs 21 to detect the thermal image records of each of the areas (step S10). Also, the setting method displays the thermal image records of the areas detected by the PDs 21 on the HMI 23 (step S12). In one embodiment, the step S12 is to display the thermal image records of the areas on the HMI 23 according to an array, wherein the array may cover all areas that need to be monitored, and the size of the array is proportional to the resolution of the PDs 21.

Next, the HMI 23 receives a user's external operation and triggers the analysis module 22 to execute a setting action for setting a non-warning area of the areas according to the thermal image records (step S14). It is worth saying that the setting system 2 in the present invention may implement the above setting action through a user setting mode, a one click detection mode, or an automatic detection mode, but not limited thereto.

After finishing the aforementioned setting action, one of the multiple areas is set as the non-warning area, and the analysis module 22 may selectively store the information related to the non-warning area to the database 24 (step S16). Furthermore, the analysis module 22 may transmit the information related to the non-warning area to a corresponding one of the PDs 21, so as to adjust the detecting parameters of the corresponding PD 21 (step S18). After being adjusted, the corresponding PD 21 may exclude the non-warning area from one or more areas with respect to the PD 21, so as to improve its detecting efficiency and detecting accuracy.

Figure 5:
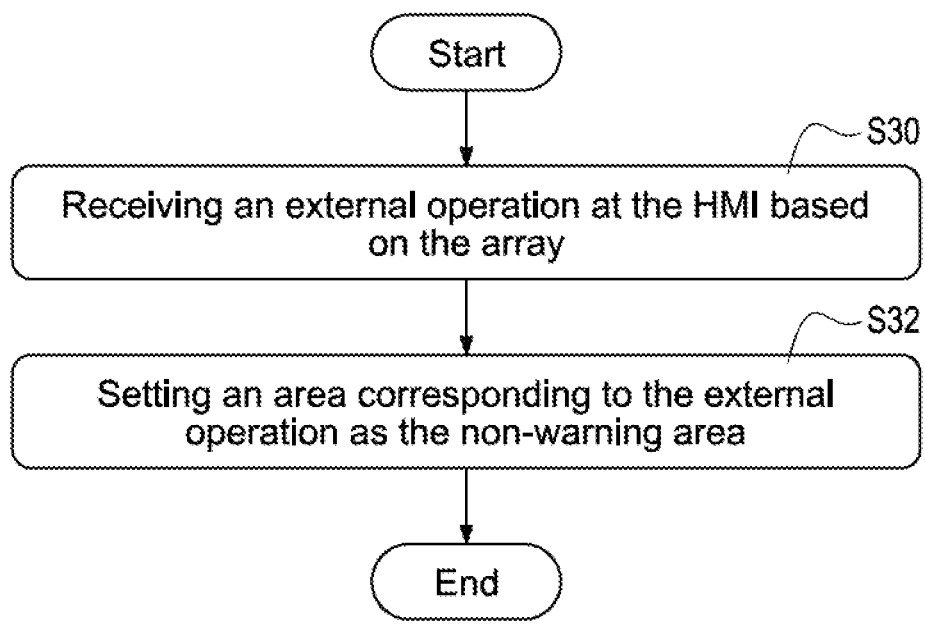
FIG. 5 is a flowchart for user setting according to the first embodiment of the present invention.

Referring to FIG. 3A, FIG. 3B, FIG. 4, and FIG. 5, FIG. 5 is a flowchart for user setting according to the first embodiment of the present invention. FIG. 5 further discusses the step S14 in FIG. 4, so as to describe how to implement the setting action for setting the non-warning area through aforementioned user setting mode.

As shown in FIG. 3A and FIG. 3B, in one embodiment, the HMI 23 may display the thermal image records of the areas 11 according to the array, and a user may check the thermal image records displayed on the HMI 23 to identify the status of a hot spot 4 presented in the areas 11 (for example, the shape of the hot spot 4, the temperature of the hot spot 4, the moving status of the hot spot 4, etc.), so as to regard the hot spot 4 as a person or a non-human heating object (e.g., a projector, a water fountain, etc.).

If the user regards the hot spot 4 as a non-human heating object, he or she may perform operation on the HMI 23 (for example, touching the seventh area, the eighth area, the eleventh area, and the twelfth area where the hot spot 4 exists on the HMI 23 as shown in FIG. 3B), so as to set the corresponding area(s) as a non-warning area 12.

In particularly, in the user setting mode of FIG. 5, the HMI 23 receives an external operation from the user based on the aforementioned array (step S30), wherein the external operation is corresponding to any one of the multiple areas 11 displayed on the HMI 23. After receiving the external operation, the analysis module 22 may directly set the one or more areas 11 corresponding to the external operation as the non-warning area 12 (step S32). Therefore, the setting action for setting the non-warning area 12 is finished, and the detecting parameters of the PD(s) 21 corresponding to the non-warning area 12 may be adjusted accordingly.

Figure 6:
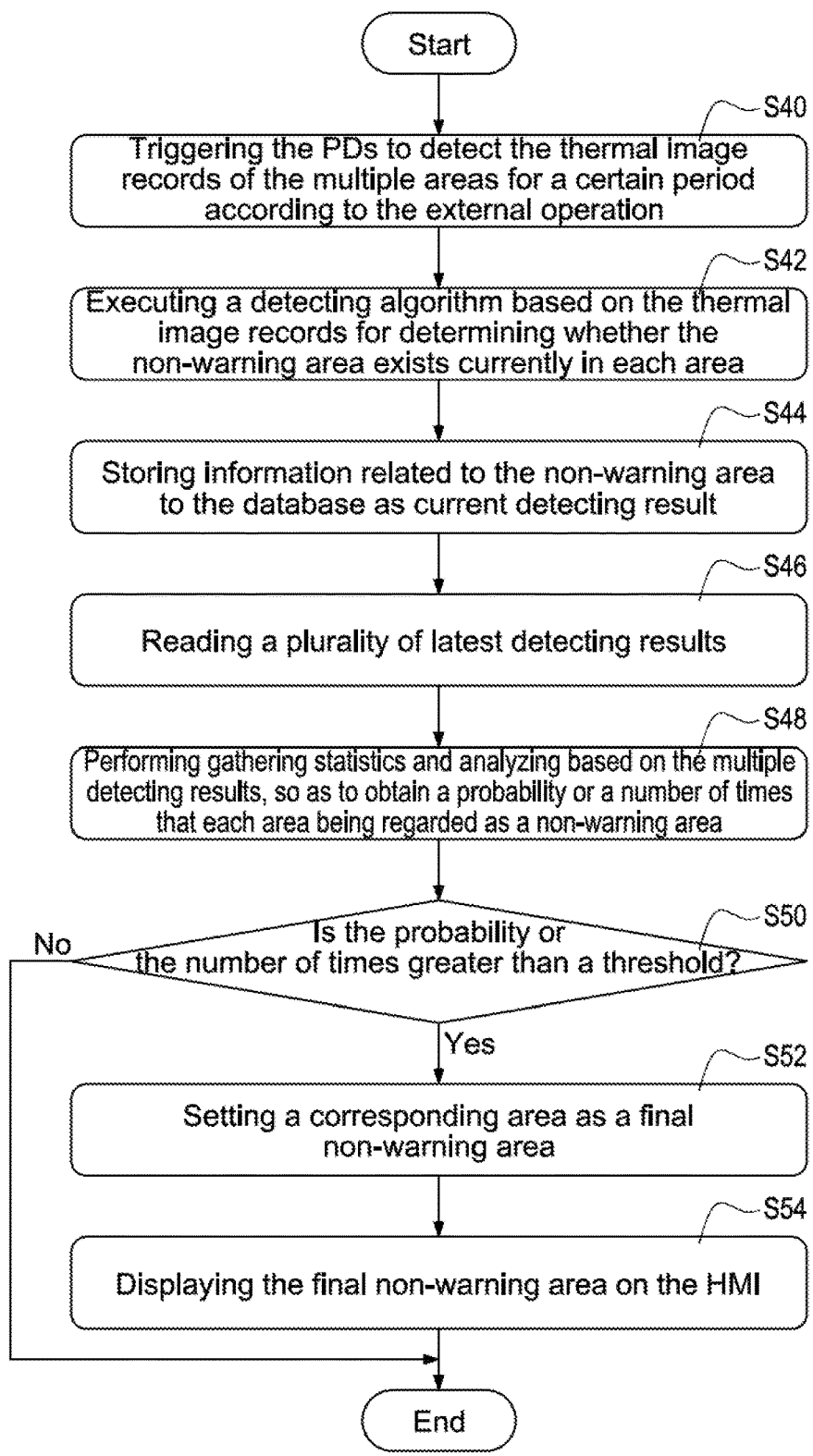
FIG. 6 is a flowchart for one click detection of a first embodiment according to the present invention.

Referring to FIG. 4, and FIG. 6, FIG. 6 is a flowchart for one click detection of a first embodiment according to the present invention. FIG. 6 further illustrates the step S14 in FIG. 4 to describe how to implement the setting action for setting the non-warning area through aforementioned one click detection mode.

In this embodiment, the HMI 23 may provide one or more detecting buttons (not shown). When a person or people leave a space 1, the detecting button can be pressed by a user to trigger the PDs 21 of the space 1 to respectively detect the non-warning area.

In particular, the HMI 23 in this embodiment receives the external operation from the user through the detecting button, so as to trigger the PDs 21 to detect, for a certain period, the thermal image records of the areas (step S40). The certain period may be decided according to the detecting efficiency of the PDs 21, the size of the space 1, the number of the hot spot inside the space 1, etc., and the certain period may be set as seconds to dozens of minutes, but not limited thereto.

As mentioned above, each of the PDs 21 may respectively execute a detecting algorithm (not shown) based on the thermal image records detected in the certain period, so as to determine whether a non-warning area exists currently in each of the areas (step S42). In particular, each of the PDs 21 analyzes whether a fixed hot spot exists in each area or not according to the thermal image records detected in the certain period, and indicates one or more areas where the fixed hot spot exists as the non-warning area. More specifically, when the detecting button is pressed, all persons should all leave the space 1, so the fixed hot spot is determined a non-human heating object with a high probability.

In one embodiment, the analysis module 22 may directly transmit the information related to the non-warning area determined in the step S42 to the HMI 23 to display thereon, and may transmit the information related to the non-warning area to the corresponding PD 21 to adjust the detecting parameters of the PD 21. In other embodiment, the analysis module 22 may further perform gathering statistics and analyzing based on multiple detecting results, so as to improve the accuracy of setting the non-warning area.

As mentioned above, the analysis module 22 may store the information related to the non-warning area to the database 24 after the step S42 (step S44), and the stored information is regarded as a detecting result for the current detecting action. Next, the analysis module 22 reads several latest detecting results from the database 24 (for example, reading N detecting results, wherein the number N may be a positive integer greater than 1) (step S46). Next, the analysis module 22 may perform gathering statistics and analyzing based on the plurality of detecting results (i.e., N detecting results), so as to obtain a probability or a number of times that each of the areas being regarded as a non-warning area (step S48).

In particular, the detecting results are respectively corresponding to different detecting actions, and each of the detecting results may respectively records whether each of the areas is regarded as a non-warning area at the corresponding detecting action. In this embodiment, the analysis module 22 may obtain the number of times (for example, one time, two times, etc.) that each of the areas being regarded as a non-warning area after performing gathering statistics and analyzing at the step S48.

In another embodiment, the above detecting results may also record the time when each area being regarded as a non-warning area. Therefore, the analysis module 22 may obtain a probability $p(i,t)$ that each of the areas being regarded as a non-warning area after performing gathering statistics and analyzing at the step S48. In the embodiment, "i" indicates the area number of each area (as shown in FIG. 3A), "t" indicates the time when the setting system 2 performs the corresponding one click detecting mode, and "p" indicates the probability that an area "i" being regarded as a non-warning area at time "t". However, the above description is only an embodiment of the present invention, and the detecting results are not limited to record the numbers of times or the probabilities only.

After step S48, the analysis module 23 further determines whether the probability or the number of times that each the area being regarded as a non-warning area is greater than a threshold (step S50). Next, the analysis module 23 set a corresponding one of the areas as a final non-warning area once the probability or the number of times that the area being regarded as a non-warning area is greater than the threshold (step S52). In this embodiment, the analysis module 23 may transmit the information related to the final non-warning area to a corresponding one of the PDs 21 to adjust the detecting parameters of the corresponding PD 21.

It should be mentioned that the aforementioned threshold may be time or number of times, but not limited thereto. For example, if a first area is regarded as a non-waring area six times in the past ten detecting results, the analysis module 23 may set the first area as the final non-warning area after gathering statistics and analyzing (e.g., the threshold is set as five times). For another example, if the execution time of the one click detection mode is one hour, and a second area is regarded as a non-warning area for eight hours in the past ten detecting results, the analysis module 23 may set the second area as the final non-warning area after gathering statistics and analyzing (e.g., the threshold is set as four hours).

After the step S52, the analysis module 22 may transmit the information related to the final non-warning area to the HMI 23, so the HMI 23 may display the information related to the final non-warning area (step S54). Therefore, a user may obtain the actual situation of each area of the space 1 on the HMI 23. The HMI 23 may further provide an adjusting interface (not shown), the user may manually adjust the amount or the location of the final non-warning area through the adjusting interface if the setting result performed by the analysis module 22 is imprecise, so as to improve the accuracy of the setting system 2.

Figure 7:
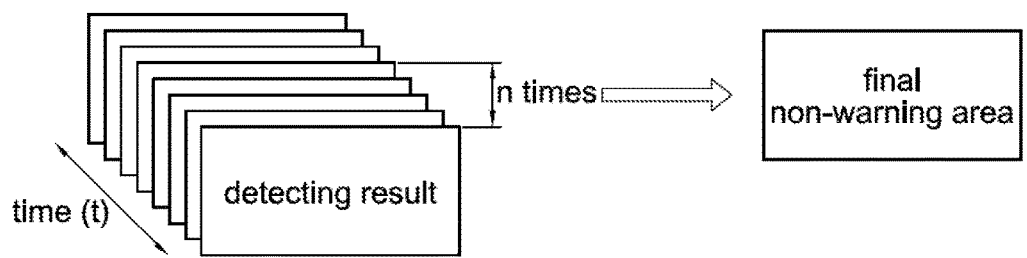
FIG. 7 is a diagram showing statistics analysis of a final non-warning area of a first embodiment according to the present invention.

FIG. 7 is a diagram showing statistics analysis of a final non-warning area of a first embodiment according to the present invention. As mentioned above, each of the PDs 21 may generate one detecting result after finishing the one click detection mode each time, and stores the generated detecting result in the database 24. Each detecting result may selectively involve the execution time (t) of the corresponding click detection mode (e.g., 7:00 in the morning, 3:20 in the afternoon, Wednesday, January 1, etc.). When performing gathering statistics and analyzing, the analysis module 22 may read the latest n detecting results from the database 24, and sets the final non-warning area by reference to the n detecting results.

In the above embodiment, the analysis module 22 may not take the relatively old detecting results in the database 24 into consideration, so the analysis accuracy may be improved.

Figure 8:
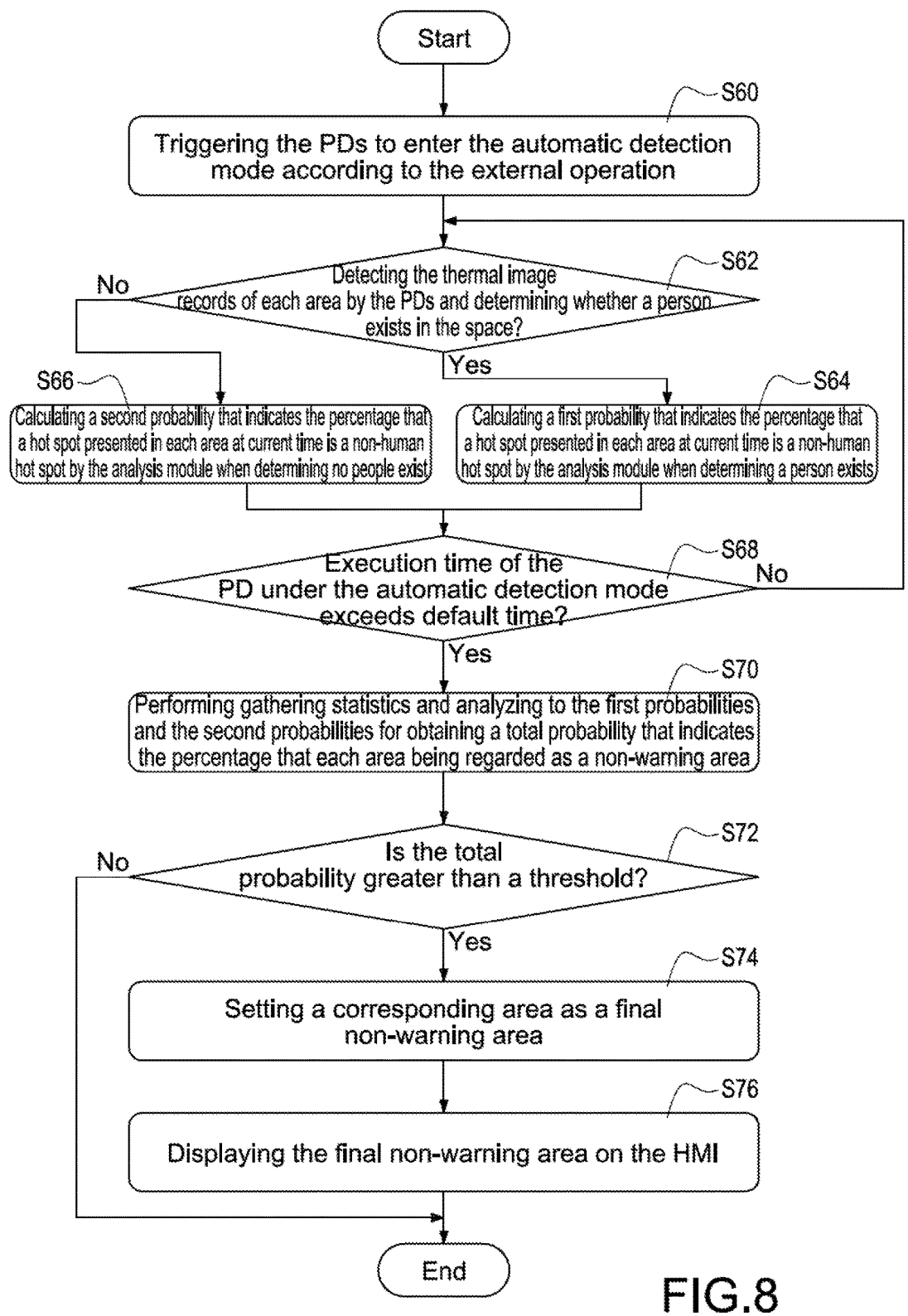
FIG. 8 is a flowchart for automatic detection of a first embodiment according to the present invention.

Referring to FIG. 4, and FIG. 8, FIG. 8 is a flowchart for automatic detection of a first embodiment according to the present invention. FIG. 8 further discusses the step S14 in FIG. 4, so as to describe how to implement the setting action for setting the non-warning area through aforementioned automatic detection mode.

In one embodiment, the PDs 21 may enter an automatic detection mode right after being activated, and the PDs 21 may automatically and continually perform detecting actions for detecting the non-warning area without being triggered by the analysis module 22 or the HMI 23. In another embodiment, the HMI 23 may provide an activation button (not shown). Once the activation button is pressed by a user, the PDs 21 may be triggered to enter the automatic detection mode.

In particular, the HMI 23 in this embodiment may receive an external operation from the user, and the HMI 23 may trigger the PDs 21 to enter the automatic detection mode according to the external operation (step S60). Next, the PDs 21 may respectively detect the thermal image records of each of the areas under the automatic detection mode, and determine whether there is a person in the space 1 based on their embedded algorithm (step S62). In one embodiment, the algorithm of the PDs 21 may judge whether a hot spot exists in the space 1 according to the thermal image records. If there is a hot spot exists in the space 1, the algorithm determines whether the hot spot is a person or a non-human heating object according to parameters (for example, the moving status of the hot spot, the shape of the hot spot, the value of the temperature of the hot spot, etc.).

For example, if a first hot spot in the space 1 does not move for a long time, the algorithm may determine that the first hot spot is a non-human heating object. For another example, if the shape of a second hot spot in the space 1 is different from that of human, the algorithm may determine that the second hot spot is a non-human heating object. For a further example, if the temperature of a third hot spot in the space 1 is way too high (e.g., higher than 70 degrees), the algorithm may determine that the third hot spot is impossible to be a person.

It should be mentioned that the non-human heating object and one or more people may exist in the same space 1 at the same time. When performing determination, the algorithm of the PDs 21 may execute integrated calculation based on the aforementioned parameters. Besides, the setting method of the present invention may perform gathering statistics and analyzing by the analysis module 22 according to a huge amount of parameters, even if the PDs 21 misjudge the existence of human, the setting for the non-warning area may not be affected (detailed discussed below).

After the step S62, if any of the PDs 21 determines that there is a person in the space 1, the analysis module 22 calculates a first probability according to the data detected by the PDs 21 (step S64), wherein the first probability indicates the percentage that a hot spot presented in each of the areas at the current time is a non-human hot spot.

For example, if there is a person in the space 1, the analysis module 22 may regard an area with an immovable hot spot as a non-human hot spot, or regard an area with a hot spot with high temperature as a non-human hot spot. Also, the analysis module 22 may obtain above first probability due to continual calculation. The aforementioned first probability may be set as p1(i.t|occupied), wherein "i" indicates the area number, "t|occupied" indicates the time the PDs 21 detect a person exists, and "p1" indicates the probability that a hot spot presented in area "i" at time "t|occupied" is a non-human hot spot.

After the step S62, if the PDs 21 determine that no people exist in the space 1, the analysis module 22 may calculate a second probability according to the data detected by the PDs 21 (step S66), wherein the second probability indicates the percentage that a hot spot presented in each of the areas at the current time is a non-human hot spot. The aforementioned second probability may be set as p2(i.t|non-occupied), wherein "i" indicates the area number, "t|non-occupied" indicates the time the PDs 21 detect that non people exist, and "p2" indicates the probability that a hot spot presented in area "i" at time "t|non-occupied" is a non-human hot spot.

After the step S64 and the step S66, the analysis module 22 further performs gathering statistics and analyzing to the first probability and the second probability, so as to obtain a total probability, wherein the total probability indicates the percentage that each of the areas in the space 1 being regarded as a non-warning area.

It should be mentioned that in the automatic detection mode of the embodiment, the analysis module 22 may make precise determinations after long time learning. That is to say, the analysis module 22 may start to perform the setting action for setting the non-warning area only if the data obtained from the PDs 21 is enough. In one embodiment, after the step S64 and the step S66, the analysis module 22 determines whether an execution time of the PD 21 under the automatic detection mode exceeds a default time or not (step S68). Before the period of the execution time that the PD 21 under the automatic detection mode exceeds the length of default time, the analysis module 22 re-executes the step S62 to the step S66, so as to control the PDs 21 to continually detect and calculate the first probability and the second probability at different time points (i.e., there might be multiple first probabilities and multiple second probabilities related to the same area at different time points).

After the execution time of PD 21 in the automatic detection mode exceeds the default time, the analysis module 22 performs gathering statistics and analyzing to the multiple first probabilities and the multiple second probabilities, so as to obtain a total probability that indicates the percentage that each of the areas in the space 1 being regarded as a non-warning area (step S70).

In one embodiment, the default time may be greater than or equal to one week, but not limited thereto. Therefore, the analysis module 22 may obtain the information of each area at a specific time point every day last week, and then analyzes the total probability that indicating the percentage that each area in the space 1 being regarded as a non-warning at the specific time point today.

After the step S70, the analysis module 22 determines whether the total probability of each area is greater than a threshold (step S72), and sets a corresponding one of the areas as a final non-warning area if the total probability of the corresponding area is greater than the threshold (step S74). In this embodiment, the analysis module 22 may transmit the information related to the final non-warning area to a corresponding one of the PDs 21 to adjust the detecting parameters of the corresponding PD 21. The threshold in this embodiment is similar to the threshold in the aforementioned one click detection mode, the detailed description is omitted.

After the step S74, the analysis module 22 may simultaneously transmit the information related to the final non-warning area to the HMI 23, and the HMI 23 may display the information related to the final non-warning area (step S76). Therefore, a user may understand the actual situation of each area of the space 1 on the HMI 23. Also, the HMI 23 may provide an adjusting interface similar to the aforementioned one click detection mode, so the user may manually adjust the amount or the location of the final non-warning area through the adjusting interface if the setting result performed by the analysis module 22 is imprecise.

It is worth saying that the setting system 2 may simultaneously adopt the aforementioned user setting mode, the one click detection mode, and the automatic detection mode, and the setting system 2 may set different weights to three analysis results of the three modes. In the step S14 of FIG. 4, the analysis module 22 may perform a final analysis according to the three analysis results of the three modes in company with the three weights of the three modes, so as to set the aforementioned final non-warning area. Therefore, the accuracy of the setting action is further improved.

In one embodiment, the setting system 2 may equally distribute the weights of the three modes. For example, the setting system 2 may set a first weight for the user setting mode as 50%, a second weight for the one click detection mode as 30%, and a third weight for the automatic detection mode as 20%.

The user setting mode is on the basis of user demand. In another embodiment, the setting system 2 may set the setting result of the user setting mode as a necessary result, and equally distributes the weights for the one click detection mode and the automatic detection mode. However, the above descriptions are only embodiments of the present invention, but not limited thereto.

By way of the setting system and the setting method of the present invention, an area with a non-human heating object in a space 1 may be pre-indicated as a non-warning area, and PDs 21 may be controlled to exclude the non-warning area from their detecting range. Therefore, the detecting accuracy of the PDs 21 may be improved, and the operating efficiency of different equipments (such as lights, air-conditions, etc.) that collaborate with the PDs 21 may be improved as well.

What is claimed is:

1. A method for setting non-warning areas of people detectors, adopted by a setting system having an analysis module, a human-machine interface and a plurality of people detectors, and the method comprising steps of:

a) arranging the plurality of people detectors for respectively detecting thermal image records of multiple areas;

b) displaying the detected thermal image records of the multiple areas on the human-machine interface;

c) receiving an external operation on the human-machine interface to trigger the analysis module to perform a setting action for setting a non-warning area of the multiple areas according to the thermal image records, and comprising:

c11) triggering the people detectors to detect the thermal image records of the multiple areas for a certain period according to the external operation; and c12) executing a detecting algorithm according to the thermal image records by each of the people detectors for determining whether the non-warning area exists in each of the areas at current time; and d) transmitting an area number or a coordinate of the set non-warning area to a corresponding one of the plurality of people detectors for adjusting detecting parameters of the corresponding people detector after the setting action is finished, wherein the adjusted people detector excludes the non-warning area from a detecting range and the non-warning area is neglected of detecting.

2. The method in claim 1, further comprising: a step e) storing the information related to the non-warning area.

3. The method in claim 1, wherein the step b displays the thermal image records on the human-machine interface according to an array, and the array covers the multiple areas.

4. The method in claim 3, wherein a size of the array is proportional to a resolution of the people detectors.

5. The method in claim 3, wherein the step c comprises steps of:

c21) receiving the external operation through the array on the human-machine interface, wherein the external operation is corresponding to one of the multiple areas; and c22) setting the area corresponding to the external operation as the non-warning area by the analysis module.

6. The method in claim 1, wherein the step c further comprises steps of:

c13) storing the information related to the non-warning area to a database as a detecting result after the step c12;

c14) reading a plurality of latest detecting results from the database;

c15) performing gathering statistics and analyzing based on the plurality of detecting results by the analysis module for obtaining a probability or a number of times that each of the areas being regarded as the non-warning area;

c16) setting a corresponding one of the areas as a final non-warning area if the probability or the number of times of the corresponding area exceeds a threshold, wherein the step d is transmitting the information related to the final non-warning area to the corresponding people detector; and c17) displaying the information related to the final non-warning area on the human-machine interface after the step c16.

7. The method in claim 1, wherein the step c comprises steps of:

c31) triggering the people detectors to enter an automatic detection mode according to the external operation;

c32) detecting the thermal image records of the multiple areas for determining whether people exist by the people detectors under the automatic detection mode;

c33) calculating a first probability that indicates a hot spot presented in each of the areas at current time is a non-human hot spot when determining that people exist;

c34) calculating a second probability that indicates the hot spot presented in each of the areas at current time is the non-human hot spot when determining that no people exist;

c35) performing gathering statistics and analyzing to the first probability and the second probability by the analysis module for obtaining a total probability that indicates each of the areas being regarded as the non-warning area;

c36) setting a corresponding one of the areas as a final non-warning area if the total probability of the corresponding area exceeds a threshold, wherein the step d is transmitting the information related to the final non-warning area to the corresponding people detector; and c37) displaying the information related to the final non-warning area on the human-machine interface after the step c36.

8. The method in claim 7, wherein the step c further comprises steps of:

c381) determining whether an execution time of the people detectors under the automatic detection mode exceeds a default time after the step c33 or the step c34;

c382) executing the step c32 to the step c34 continually for calculating the first probability and the second probability at different time points before the execution time exceeds the default time; and c383) executing the step c35 after the execution time exceeds the default time, wherein the step c35 performs gathering statistics and analyzing according to the plurality of first probabilities and the plurality of second probabilities.

9. The method in claim 8, wherein the default time is greater than or equal to one week.

10. The method in claim 8, wherein the step c32 determines a moving status of a hot spot, a shape of the hot spot, a value of the temperature of the hot spot according to the thermal image records, so as to determine whether the hot spot is a person or not.

11. A system for setting non-warning areas of people detectors, comprising:

a plurality of people detectors, respectively detecting thermal image records of multiple areas;

a human-machine interface, receiving and displaying the thermal image records; and an analysis module, electrically connected with the plurality of people detectors and the human-machine interface, the analysis module being triggered to perform a setting action for setting a non-warning area of the multiple areas according to the thermal image records when the human-machine interface receives an external operation, wherein the analysis module is configured to transmit an area number or a coordinate of the set non-warning area to a corresponding one of the people detectors for adjusting detecting parameters of the corresponding people detector, wherein the adjusted people detector is configured to exclude the non-warning area from a detecting range and the non-warning area is neglected of detecting;

wherein the setting action triggers the people detectors to detect the thermal image records of the multiple areas for a certain period, and the people detectors are configured to execute a detecting algorithm according to the thermal image records for determining whether the non-warning area exists in each of the areas at current time.

12. The system in claim 11, wherein the system further comprises a database electrically connected with the analysis module, and the database is configured to store the information related to the non-warning area.

13. The system in claim 11, wherein the human-machine interface is configured to display the thermal image records according to an array, wherein the array covers the multiple areas, and a size of the array is proportional to a resolution of the people detectors.

14. The system in claim 13, wherein the human-machine interface is configured to receive the external operation through the array, wherein the external operation corresponds to one of the areas, and the analysis module is configured to set the area corresponding to the external operation as the non-warning area.

15. The system in claim 11, wherein the analysis module is configured to store the information related to the non-warning area determined by the detecting algorithm to a database as a detecting result, and is configured to read a plurality of latest detecting results from the database, then performs gathering statistics and analyzing based on the plurality of detecting results for obtaining a probability or a number of times that each of the areas being regarded as the non-warning area, and the analysis module is further configured to set a corresponding one of the areas as a final non-warning area if the probability or the number of times of the corresponding area exceeds a threshold, and transmits the information related to the final non-warning area to the corresponding people detector.

16. The system in claim 11, wherein the setting action triggers the people detectors to enter an automatic detection mode for detecting the thermal image records of the multiple areas and determining whether people exist or not, the analysis module is configured to calculate a first probability that indicates a hot spot presented in each of the areas at current time is a non-human hot spot when determining that people exist, and to calculate a second probability that indicates the hot spot presented in each of the areas at current time is the non-human hot spot when determining that no people exist, and the analysis module is further configured to perform gathering statistics and analyzing to the first probability and the second probability for obtaining a total probability that indicates each of the areas being regarded as the non-warning area, wherein the analysis module is configured to set a corresponding one of the areas as a final non-warning area if the total probability of the corresponding area exceeds a threshold, and transmits the information related to the final non-warning area to the corresponding people detector.

17. The system in claim 16, wherein each of the people detectors is configured to continue performing detection and determination before an execution time of the people detectors under the automatic detection mode exceeds a default time, and the analysis module is configured to continue calculating the first probability and the second probability at different time points, and to perform gathering statistics and analyzing according to the plurality of first probabilities and the plurality of second probabilities.

18. The system in claim 17, wherein each of the people detectors is configured to determine a moving status of the hot spot, a shape of the hot spot, a value of the temperature of the hot spot according to the thermal image records, so as to determine whether people exist or not.

* * * * *